Patented June 30, 1936

2,045,968

UNITED STATES PATENT OFFICE 2,045,968

3,5,8,10-TETRAAROYLPYRENES AND PROCESS OF MAKING THE SAME

Roland Scholl, Dresden, and Kurt Meyer, Berlin-Zehlendorf, Germany, assignors to the firm of Society of Chemical Industry in Basle, Basel, Switzerland No Drawing. Application July 8, 1935, Serial No. 30,406. In Switzerland July 11, 1934

7 Claims. (Cl. 260—64)

It has been found that new pyrene derivatives are obtained, which may be referred to as 3,5,8,10-tetraaroylpyrenes of the general formula

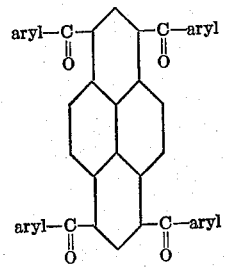

wherein aryl stands for nuclei of the benzene or naphthalene series, by treating pyrene with an excess of aroylating agents, preferably in the presence of catalysts.

The tetraaroylation of the pyrene is best carried out in the presence of a suitable solvent or dispersing agent. Such agents are the so-called indifferent solvents, above all such chlorinated hydrocarbons which boil above 100° C., contain no labile chlorine atoms, and are readily volatile with steam. Such products are for example tetrachlorethane, trichlorobenzene, etc. Also other solvents, for example nitrobenzene or α-chlornaphthalene may come into consideration.

As catalyst there may be used the salts of metals, preferably the halides of the trivalent metals, such as iron chloride or aluminium chloride.

As aroylating agents there come above all into consideration the halides of the carboxylic acids of the benzene series, such as benzoyl chloride, the chloro- or bromo-benzoyl chlorides, the anisoyl chloride, further the naphthoyl chlorides, etc.

The following example illustrates the invention, the parts being by weight:—

10 parts of pyrene are heated for 3 hours with 50 parts of acetylene tetrachloride, 40 parts of benzoyl chloride, and 0.5 part of sublimated iron chloride. The solvent is then removed by steam distillation, the residue filtered, and extracted with dilute sodium carbonate solution to remove the benzoic acid which has formed. The residue is boiled out with about 10 parts of trichlorobenzene. After cooling of the extract a pure 3,5,8,10-tetrabenzoylpyrene of the formula

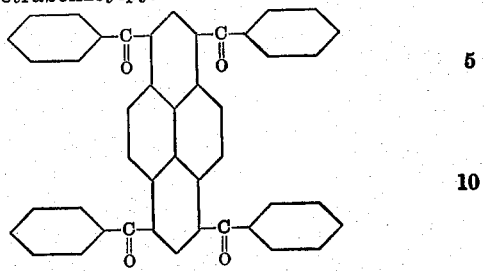

is obtained in a very good yield.

It is a valuable intermediated product for the production of dyestuffs. By treatment with chlorinating agents it is thus for example converted into a chlor-addition product which, when fused with caustic alkali and quinoline, transforms into a dyestuff dyeing cotton from the vat fast yellow-brown tints.

What we claim is:—

1. Process for the production of 3,5,8,10-tetra-aroylpyrenes, consisting in treating pyrene in the presence of a liquid chlorinated hydrocarbon which boils above 100° C., is readily volatile with steam, and contains no labile chlorine atoms and a halide of a trivalent metal with an excess of an aroyl halide selected from the group of the mono-aroyl-halides of the benzene and naphthalene series, the operation being carried out at temperatures lying above 100° C.

2. Process for the production of 3,5,8,10-tetra-aroylpyrenes, consisting in treating pyrene in the presence of a liquid chlorinated hydrocarbon which boils above 100° C., is readily volatile with steam, and contains no labile chlorine atoms and iron chloride with an excess of an aroyl halide selected from the group of mono-aroyl-halides of the benzene and naphthalene series, the operation being carried out at temperatures lying above 100° C.

3. Process for the production of 3,5,8,10-tetra-aroylpyrenes, consisting in treating pyrene in the presence of a liquid chlorinated hydrocarbon which boils above 100° C., is readily volatile with steam, and contains no labile chlorine atoms and iron chloride with an excess of an aroyl halide of the benzene series, the operation being carried out at temperatures lying above 100° C.

4. Process for the production of 3,5,8,10-tetraaroylpyrenes, consisting in treating pyrene in the presence of tetrachlorethane and iron chloride with an excess of an aroyl halide of the benzene series, the operation being carried out at temperatures lying above 100° C.

5. Process for the production of a 3,5,8,10-tetraaroylpyrene, consisting in treating pyrene in the presence of tetrachlorethane and iron chloride with an excess of benzoyl chloride, the operation being carried out at temperatures lying above 100° C.

6. The 3,5,8,10-tetraaroylpyrene of the formula

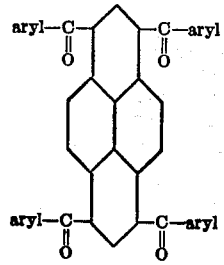

wherein aryl stands for nuclei selected from the group of the aromatic nuclei of the benzene and naphthalene series.

7. The 3,5,8,10-tetraaroylpyrene of the formula

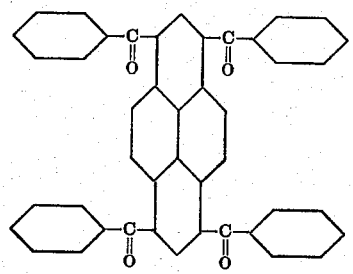

ROLAND SCHOLL.
KURT MEYER.